United States Patent
Zlatnik

(10) Patent No.: US 9,256,641 B1
(45) Date of Patent: Feb. 9, 2016

(54) DYNAMIC OPTIMIZATION OF DATA AGGREGATION

(71) Applicant: Pavel Zlatnik, Prague (CZ)

(72) Inventor: Pavel Zlatnik, Prague (CZ)

(73) Assignee: CA, Inc., New York, NY (US)

( * ) Notice: Subject to any disclaimer, the term of this patent is extended or adjusted under 35 U.S.C. 154(b) by 264 days.

(21) Appl. No.: 14/057,074

(22) Filed: Oct. 18, 2013

(51) Int. Cl.
*G06F 17/30* (2006.01)

(52) U.S. Cl.
CPC .................. *G06F 17/30442* (2013.01)

(58) Field of Classification Search
USPC ......... 707/765, 687, 688, 705, 775, 752, 790, 707/813, 821
See application file for complete search history.

(56) References Cited

U.S. PATENT DOCUMENTS

| | | | | |
|---|---|---|---|---|
| 2010/0205541 A1* | 8/2010 | Rapaport | ............... | G06Q 10/10 715/753 |
| 2012/0197911 A1* | 8/2012 | Banka | ............... | G06F 17/30864 707/752 |
| 2013/0332487 A1* | 12/2013 | Ramesh | ............ | G06F 17/30477 707/775 |

* cited by examiner

*Primary Examiner* — Sana Al Hashemi
(74) *Attorney, Agent, or Firm* — Baker Botts L.L.P.

(57) ABSTRACT

A method includes receiving a first database query, in which the first database query requests particular data associated with a first object that is stored on a data source. The method also includes determining whether the first database query includes an aggregation function. The method also includes sending an instruction to generate current aggregate data based on the aggregation function to the data source in response to determining that the first database query includes the aggregation function, in which the current aggregate data corresponds to the particular data. The data source is configured to generate the current aggregate data in response to receiving the instruction. The method includes generating a second database query based on the first database query, in which the second database query requests the current aggregate data. The method also includes retrieving the current aggregate data using the second database query and providing the current aggregate data.

21 Claims, 4 Drawing Sheets

DYNAMIC OPTIMIZATION OF DATA AGGREGATION

BACKGROUND

The present disclosure relates to cloud computing and database organization and, more specifically, to a method and system for dynamic optimization of data aggregation.

Enterprises process and analyze data on a daily basis. Such data may be located in objects such as tables, which are stored on data sources. Data sources may include databases and non-database data sources. Users may easily access and process data within objects stored on databases. Specifically, users may use instructions developed using database languages such as Structured Query Language ("SQL") to select and process specific data within objects stored on a database.

However, problems may arise when users are working with data that is stored on non-database data sources. Such data sources may not support SQL or other types of database languages. Thus, selected data may have to be moved from those data sources to a virtual database in order to be processed using conventional database tools. When the amount of selected data is large, this may result in huge inefficiencies. In particular, a lot of memory may be required to store the selected data in the virtual database, significant time may be spent moving the selected data to the virtual database, and high network traffic due to the transfer of selected data may cause other operations to slow down.

BRIEF SUMMARY

According to an aspect of the present disclosure, a method may comprise receiving a first database query, the first database query requesting particular data associated with a first object. The first object may be stored on a data source. The method may further comprise determining whether the first database query comprises an aggregation function. The method may further comprise sending an instruction to generate current aggregate data based on the aggregation function to the data source in response to determining that the first database query comprises the aggregation function. The data source may be configured to generate the current aggregate data in response to receiving the instruction, the current aggregate data corresponding to the particular data. The method may further comprise generating a second database query based on the first database query, the second database query requesting the current aggregate data. The method may further comprise retrieving the current aggregate data using the second database query and providing the current aggregate data. The method may further comprise issuing the first query in response to determining that the first database query does not comprise the aggregation function.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
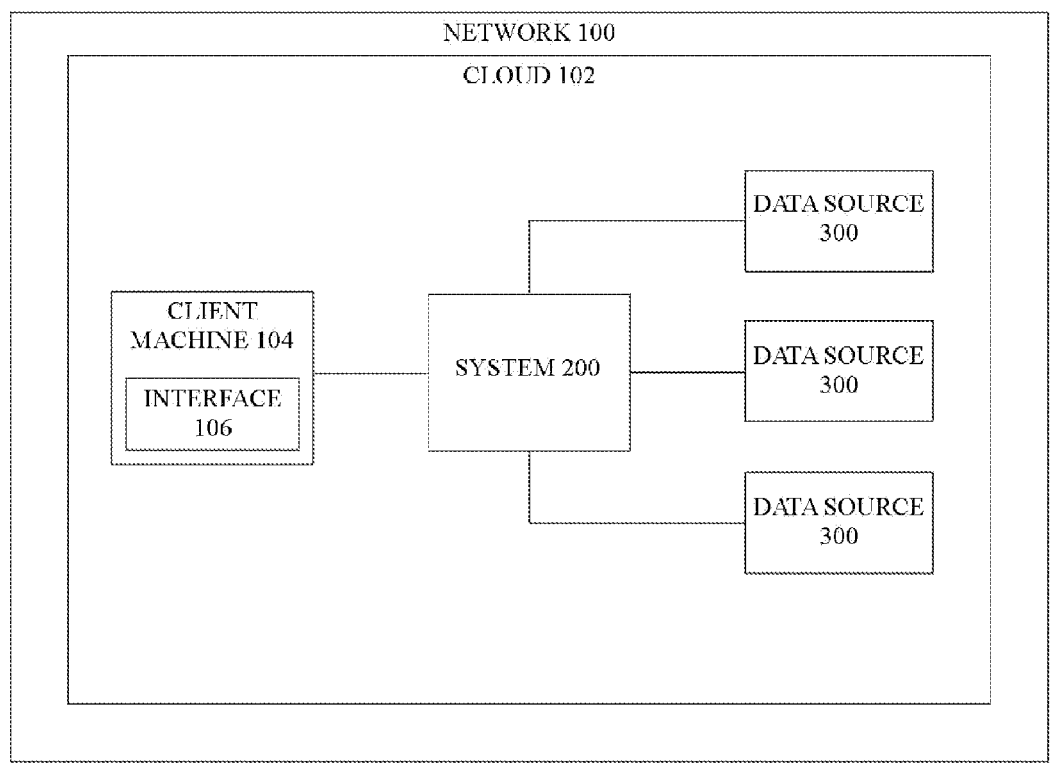
FIG. 1 is a schematic representation of an example network having a system for providing aggregate data by sending an instruction to generate aggregate data to a data source and retrieving the aggregate data.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to cloud computing, systems and methods disclosed herein may also be related to other areas of cloud environments and cloud computing (e.g., architecture and data management, emerging technologies, service assurance, deployment and virtualization); architecture; database management; data modeling and analysis; governance; risk and compliance for information technology ("IT"); project, portfolio, and financial management; software engineering; mainframe and IT service and asset management; IT service and asset management; mainframe; middleware and common services; usability and user experience; vertical specific technology applications; security management; mobility; application performance management; service assurance; alternative software delivery method; automation; and infrastructure and operations management.

Enterprises process and analyze data on a daily basis. Such data may be located in objects (e.g., tables, records, graphs, sets, arrays), which are stored on data sources. Data sources may include databases and non-database data sources. Users may create, select, manipulate, and manage data within objects stored on databases using database management systems ("DBMSs"). Typically, DBMSs operate using the standard language SQL. Accordingly, data stored in databases may be accessed using statements or queries written in SQL.

However, problems may arise when users are working with data that is stored on non-SQL-compliant or non-database data sources. Because such data sources do not support SQL, selected data from those data sources may have to be moved to a virtual database in order to be processed using SQL functions or commands. When the amount of selected data is large, this may result in huge inefficiencies. In particular, a large amount of memory may be required to store selected data in the virtual database, significant time may be spent moving selected data to the virtual database, and high network traffic due to the transfer of selected data may cause other operations to slow down.

Systems and methods described herein may provide a method for optimizing aggregation of data stored on non-SQL compliant data sources. A user may want to aggregate specific data located in an object on a data source. Table 1 may be an example of such an object:

TABLE 1

| ItemID | ... | UNUSED | BYTES |
|---|---|---|---|
| 1 | ... | 528 | 102,400 |
| 2 | ... | 10 | 307,200 |
| 3 | ... | 290 | 716,800 |
| ... | ... | ... | ... |
| 1000000 | ... | 782 | 0 |
| 1000001 | ... | 413 | 102,400 |
| 1000002 | ... | 196 | 81,920 |

A first column "UNUSED" may specify a number of days that an item has been unused, and a second column "BYTES" may specify an amount of memory in bytes that is allocated to the item. Table 1 may be stored on a data source 1.

When aggregating specific data in Table 1, the user may provide a first query:
SELECT COUNT(BYTES), SUM(BYTES) FROM DATA-SOURCE_1.TABLE_1 WHERE UNUSED>=365
where the specific data corresponds to all rows within Table 1 where a first column "UNUSED" is greater than or equal to 365 (e.g., the records for all items in Table 1 that have remain unused for at least one year). Two aggregation functions—"COUNT( )" and "SUM( )"—operate on the specific data. Specifically, the function "COUNT( )" counts the number of rows of specific data, and the function "SUM( )" sums all the values of specific data in the second column "BYTES." Other examples of aggregation functions include, but are not limited to, "AVG( )," which returns an average value of data in a column; "FIRST( )" which returns a first value of data in a column; "LAST( )," which returns a last value of data in a column; "MAX( )" which returns a largest value of data in a column; and "MIN( )" which returns a smallest value of data in a column.

Data source 1 may be a non-SQL compliant data source. Consequently, in existing systems, the rows of specific data may have to be moved to a virtual database before the aggregation functions are applied. When Table 1 includes a large number of records, this may involve moving a significant amount of data, which, as noted above, may lead to inefficiencies. In contrast, systems and methods described herein may instruct data source 1 to aggregate the specific data at the back end. Data source 1 may identify the specific data, apply the aggregation functions (in this example, "COUNT (BYTES)" and "SUM(BYTES)"), and create a summary object with the results of the aggregation. The summary object may be a second table that includes a single row with the results of the aggregation, for example:

TABLE 2

| ... | COUNT_BYTES | SUM_BYTES | ... |
|---|---|---|---|
| ... | 134,976 | 9,216,353,280 | ... |

Table 2 may have a first row "COUNT_BYTES" and a second row "SUM_BYTES" that correspond to the aggregation functions "COUNT(BYTES)" and "SUM(BYTES)," respectively.

To retrieve the results of the aggregation from the summary object, systems and methods described herein may transform the first query into a new query. In this example, the new query may be:
SELECT COUNT_BYTES, SUM_BYTES FROM DATA-SOURCE_1.TABLE_2

The new query is issued against the summary object with the aggregation functions already applied. Accordingly, only the results of the aggregation are transferred to the virtual database and onto the user. By only transferring the results of the aggregation, systems and methods described herein may move less data over the network, thereby reducing network traffic. Moreover, less time and other resources may be spent moving and storing the transferred data on the virtual database.

Referring now to FIG. 1, a network 100 may comprise one or more clouds 102, which may be public clouds, private clouds, or community clouds. Each cloud 102 may permit the exchange of data and services among clients or users that are connected to such clouds 102. In certain configurations, cloud 102 may be a wide area network, such as the Internet. In some configurations, cloud 102 may be a local area network, such as an intranet. Further, cloud 102 may be a closed, private network in certain configurations, and cloud 102 may be an open network in other configurations. Cloud 102 may facilitate wired or wireless communications of data and provisioning of services among clients that are connected to or using devices in cloud 102.

Network 100 may also comprise one or more servers operated by administrators (e.g., database administrators, network administrators, server administrators, system administrators), service providers (e.g., application service providers, network service providers, Internet service providers, managed service provider, data services provider), and other parties. Administrators, service provides, and other parties may provide data and services to clients by utilizing the one or more servers, which connect to one or more devices utilized by clients. The services may comprise, for example, information technology services, data services, network services, access services, monitoring services, operations services, infrastructure services, and other resource-provisioning services. The one or more servers may comprise general purpose computing devices, specialized computing devices, mainframe devices, wired devices, wireless devices, monitoring devices, infrastructure devices, and other devices configured to provide one or more of services and data to clients. The one or more devices may comprise one or more general purpose computing devices, specialized computing devices, mobile devices, wired devices, wireless devices, passive devices, routers, switches, mainframe devices, monitoring devices, infrastructure devices, and other devices utilized by clients.

Figure 2:
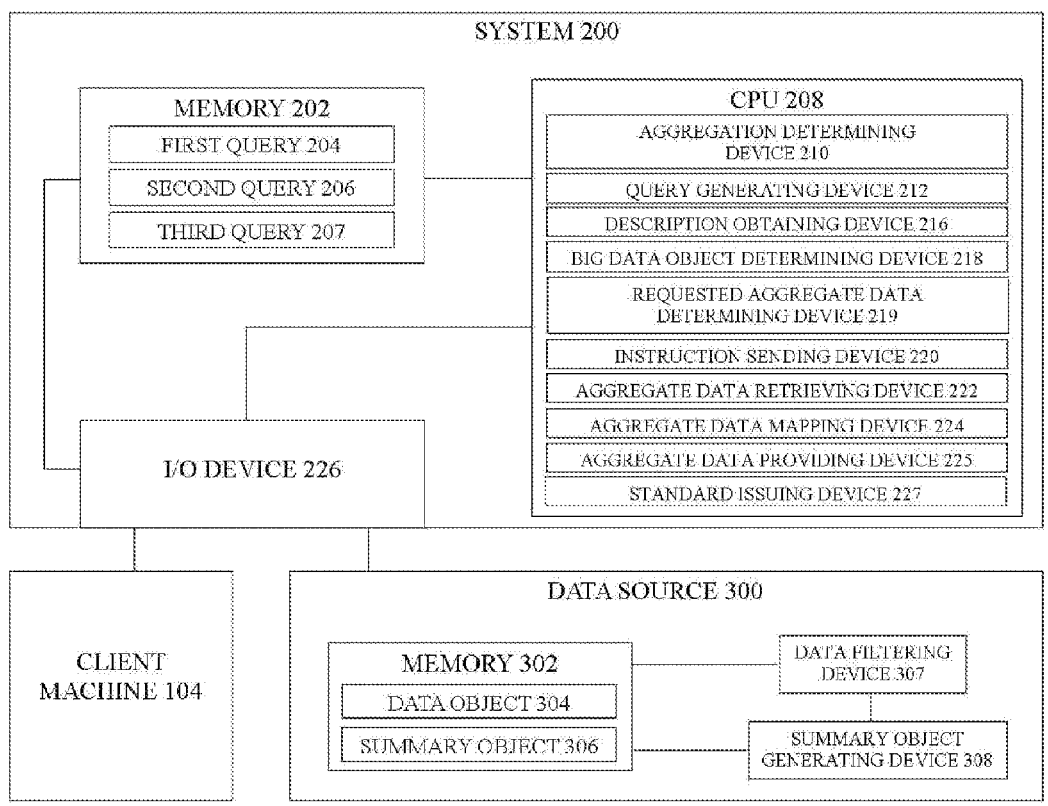
FIG. 2 depicts a block diagram of an example configuration for providing aggregate data by sending an instruction to generate aggregate data to a data source and retrieving the aggregate data.

Examples of servers and devices include data sources 300 and client machines 104. Each data source 300 may comprise a memory 302 (depicted in FIG. 2). One or more objects may be stored in memory 302. The one or more objects may be data structures that contain data. Examples of objects include tables, graphs, records, sets, and arrays. Certain of data sources 300 may be SQL compliant; others may be non-SQL compliant. For example, a first data source 300 may be a database, whereas a second data source 300 may be a non-database data source (e.g., a mainframe storage that uses a proprietary communication and data exchange protocol). FIG. 2, described below, provides a more detailed view of data source 300. Each client machine 104 may comprise an interface 106. Interface 106 may be a user interface (e.g., a text-based user interface, a graphical user interface), a hardware interface, a software interface, or any interface that is configured to send or receive data. Interface 106 may comprise one or more applications or programs that allow clients to access services and data provided by administrators, service providers, and other parties in cloud 102. In particular, interface 106 may comprise a data processing program interface through which a client may access and manipulate data stored on data sources 300 in cloud 102.

Moreover, network 1 may comprise one or more systems 200. System 200 may be, for example, one or more of a general purpose computing device, a specialized computing device, a wired device, a wireless device, a mainframe device, an infrastructure device, a monitoring device, and any other device configured collect and receive data from one or more data sources (e.g., servers, sensors, networks, interfaces, other devices). In particular, system 200 may connect to cloud 102 and collect and receive data from client machine 104, data sources 300, and other servers and devices in cloud 102. By collecting and receiving this information from client machine 104, data sources 300, and other servers and devices in cloud 102, system 200 may provide aggregate data to a client. Specifically, system 200 may receive a first database query from a client. The first database query may request particular data associated with a first object, which is stored on a data source 300. When the first database query includes an aggregation function, system 200 may send an instruction to generate current aggregate data based on the aggregation function to the data source 300. Upon receiving the instruction, the data source 300 may generate the current aggregate data. System 200 may generate a second database query based on the first database query and use the second database query to obtain the current aggregate data. System 200 may then provide the aggregate data to the client.

System 100 may comprise one or more servers and devices. In certain configurations, one or more of client machines 104 and data sources 300 may comprise system 100. In other configurations, system 100 may be separate from client machines 104 and data sources 300.

Referring now to FIG. 2, FIG. 2 depicts a block diagram of an example configuration for providing aggregate data by sending an instruction to generate aggregate data to a data source and retrieving the aggregate data. This configuration may exist in a network 100, as depicted in FIG. 1, having a system a client machine 104, a system 200, and a data source 300. System 200 may comprise a memory 202, a central processing unit ("CPU") 208, and an input and output ("I/O") device 226. Memory 202 may comprise volatile and non-volatile memory. Memory 202 may store computer-readable instructions that may instruct system 200 to perform certain processes. In particular, when executed by CPU 208, the computer-readable instructions stored in memory 202 may instruct CPU 208 to operate as one or more of an aggregation determining device 210, a query generating device 212, a description obtaining device 216, a big data object determining device 218, a requested aggregated data determining device 119, an instruction sending device 220, an aggregate data retrieving device 222, an aggregate data mapping device 224, an aggregate data providing device 225, and a standard issuing device 227. Aggregate function determining device 210 may be an example of a first determining device; query generating device 212 may be an example of a first generating device and a second generating device; description obtaining device 216 may be an example of an obtaining device and, more specifically, a converting device and a third sending device; big data object determining device 218 may be an example of a second determining device; requested aggregate data determining device 219 may be an example of a third determining device; instruction sending device 220 may be an example of a first sending device and a second sending device; aggregate data retrieving device 222 may be an example of a first retrieving device and a second retrieving device; aggregate data mapping device 224 may be an example of a mapping device; and aggregate data providing device 225 may be an example of a first providing device and a second providing device.

In particular configurations, one or more of aggregation determining device 210, query generating device 212, description obtaining device 216, big data object determining device 218, requested aggregate data determining device 119, instruction sending device 220, aggregate data retrieving device 222, aggregate data mapping device 224, aggregate data providing device 225, and standard issuing device 227 may be implemented on one or more different CPUs, which may be comprised in remote or local devices.

I/O device 226 may receive one or more of data from cloud 102, data from other devices and sensors connected to system 200, and input from a client and provide such information to CPU 208. I/O device 226 may transmit data to cloud 102, may transmit data to other devices connected to system 200, and may transmit a notification to a client (e.g., display or send a message, make a sound). In particular, I/O device 226 may receive data from and/or transmit data to client machine 104 and data source 300. Further, I/O device 226 may implement one or more of wireless and wired communication between system 200 and other devices (e.g., client machine 104, data source 300). I/O device 226 may be an example of a first receiving device, a second receiving device, a first sending device, and a second sending device.

Data source 300 may comprise a memory 302, a data filtering device 307, and a summary object generating device 308. Memory 302 may store objects such as a data object 304 and a summary object 306. Memory 302 may also store computer-readable instructions that when executed by one or more CPUs (not depicted) may cause the one or more CPUs to perform certain processes. In certain configurations, the one or more CPUs may act as one or more of data filtering device 307 and summary object generating device 308 when executing the computer-readable instructions.

Figure 3:
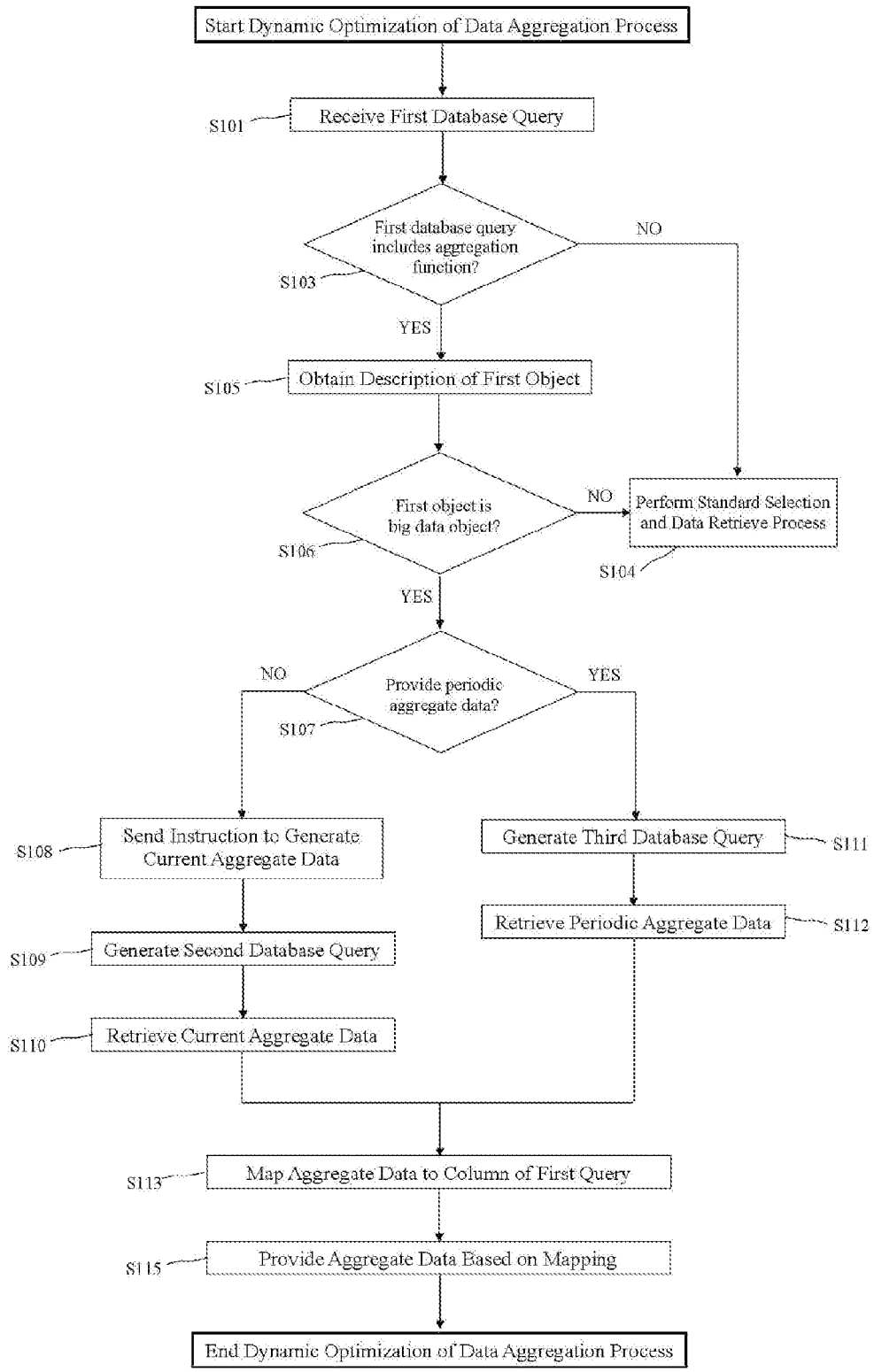
FIG. 3 depicts an example process of providing aggregate data by sending an instruction to generate aggregate data to a data source and retrieving the aggregate data.
Figure 4:
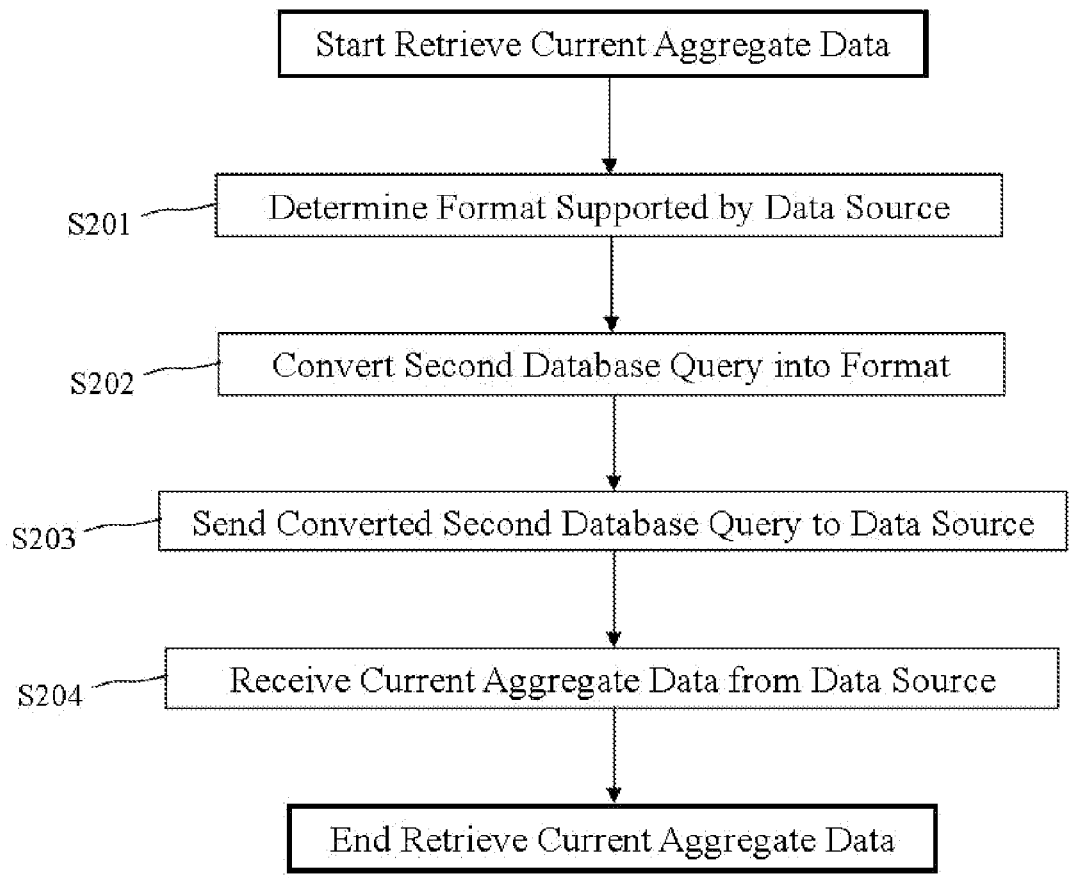
FIG. 4 depicts an example process of retrieving aggregate data.

Referring now to FIGS. 3 and 4, example processes performed by system 200 now are described. FIG. 3 depicts an example process of providing aggregate data by sending an instruction to generate aggregate data to a data source and retrieving the aggregate data. A client may input a first query 204 into interface 106 on client machine 104. First query 204 may be a database query such as, for example, a SQL query (e.g., a query written in SQL). First query 204 may request particular data associated with data object 304 stored on data source 300, as depicted in FIG. 2. Specifically, first query 204 may request one or more aggregate values, calculated from values in a defined result set. Using the values in Table 1, first query 204 may be:
SELECT COUNT(BYTES), SUM(BYTES) FROM DATASOURCE_1.TABLE_1 WHERE UNUSED>=365 where the data source identifier "DATASOURCE_1" corresponds to data source 300 (as depicted in FIG. 2) and the object identifier "TABLE_1" corresponds to data object 304 (as depicted in FIG. 2). The result set may correspond to all rows within Table 1 having a value in the column "UNUSED" that is greater than or equal to 365.

Client machine 104 may send first query 204 to system 200. In S101, I/O device 226 may receive first query 204 and pass it to CPU 208. First query 204 may be stored in memory 202 on system 200. In S103, aggregation determining device 210 may determine whether first query 204 comprises an aggregation such as, for example, an aggregation function. As noted above, examples of aggregation functions include "COUNT( )" which returns a number of rows; "SUM( )" which returns a sum of the values of data in a column; "AVG( )," which returns an average value of data in a column; "FIRST( )" which returns a first value of data in a column; "LAST( )," which returns a last value of data in a column; "MAX( )" which returns a largest value of data in a column; and "MIN( )" which returns a smallest value of data in a column. When first query 204 does not comprise an aggregation function (S103: NO), the process may proceed to S104. In S104, system 200, acting as standard issuing device 227, may perform a standard selection and data retrieve process (e.g., system 200 may issue first query 204 normally). System 200 may determine whether data source 300 is SQL-complaint. When data source 300 is not SQL-compliant, system 200 may convert first query 204 into a format that is supported by data source 300 (e.g., transform first query 204 into a native request such as a Vantage Application Programming Interface ("API") request or an Enterprise Web Services ("EWS") message). System 200 may send or pass first query 204 to data source 300 to return the particular data that has been requested.

When first query 204 comprises an aggregation function (S103: YES), the process may proceed to S105. In the example provided, first query 204 includes two aggregation functions, "COUNT( )" and "SUM( )" Accordingly, aggregation determining device 210 may determine that first query 204 comprises an aggregation function, and the process may proceed to S105. In S105, description obtaining device 216 may obtain a description of data object 304. In particular, description obtaining device 216 may connect to data source 300 via EWS or some other platform and pass an object definition request (e.g., a function or command that requests attributes the definition of an object) to data source 300 to retrieve a description of data object 304. The description of data object 304 may include one or more object descriptors that define various attributes of data object 304.

Then, in S106, big data object determining device 218 may determine whether data object 304 comprises a predetermined amount of data based on the description of data object 304. The predetermined amount of data may correspond to an amount of data that may require significant resources to process. Specifically, the predetermined amount of data may correspond to an amount of data that is generally associated with big data objects. Big data objects may be objects that comprise large and complex data that may be difficult to process using standard data processing applications and tools. As the industry for data processing applications develops, big data objects may refer to objects having increasingly large and complex data sets. Thus, the predetermined amount of data may be adjusted to account for changing industry standards. Determining whether data object 304 comprises the predetermined amount of data may involve checking (e.g., reviewing, analyzing) the description of data object 304. In certain instances, a particular object descriptor may flag or mark data object 304 as a big data object. Accordingly, data object determining device 218 may easily identify data object 304 as a big data object and conclude that is comprises a predetermine amount of data.

When big data object determining device 218 determines that data object 304 does not comprise the predetermined amount of data (S106: NO), the process may proceed to S104 (described above). When big data object determining device 218 determines that data object 304 comprises the predetermined amount of data (e.g., when big data object determining device 219 determines that data object 304 is a big data object) (S106: YES), the process may proceed to S107. In S107, requested aggregate data determining device 219 may determine whether to provide periodic aggregate data or current aggregate data to the client. Periodic aggregate data may correspond to aggregate data that is generated by data source 300 at set intervals (e.g., once every hour or few minutes). Current aggregate data may correspond to real-time aggregate data, which is generated by data source 300 at the time of each request. Data source 300 may require a certain amount of time to generate aggregate data. This amount of time may vary depending on the amount and complexity of the data in the result set. Thus, when a request is urgent or when real-time data is not required, system 200 may provide periodic aggregate data in lieu of current aggregate data.

Accordingly, requested aggregate data determining device 219 may check for an input or setting which may indicate whether to provide periodic aggregate data or current aggregate data. For example, an input that requests quick turnaround time may indicate that periodic aggregate data should be provided instead of current aggregate data. When no such input or setting exists, requested aggregate data determining device 219 may send a message to the client, asking the client to specify the type of aggregate data (e.g., periodic aggregate data or current aggregate data) that it would like to receive. Or, in the alternative, requested aggregate data determining device 219 may default to providing either periodic aggregate data or current aggregate data, depending on system requirements.

When requested aggregate data determining device 219 determines to provide current aggregate data (S107: NO), the process may proceed to S108. In S108, instruction sending device 220 may send an instruction to generate current aggregate data based on the aggregation functions in first query 204 (e.g., "COUNT(BYTES)" and "SUM(BYTES)") to data source 300. When data source 300 receives the instruction, data source 300 may generate the current aggregate data and place the current aggregate data in a summary object 306. When summary object 306 does not exist, data source 300 may create summary object 306. In this example, Table 2 may represent summary object 306. Data source 300 may then send a message to system 200, confirming that the current aggregate data has been generated and placed in summary object 306.

In S109, query generating device 212 may generate a second query 206 based on first query 204. Second query 206 may request the current aggregate data, and, since the current aggregate data is located in summary object 306, second query 206 may be issued against summary object 306 instead of data object 304. Keeping with Table 2, second query 206 may be:

SELECT COUNT_BYTES, SUM_BYTES FROM DATASOURCE_1.TABLE_2
where the data source identifier "DATASOURCE_1" corresponds to data source 300 and the object identifier "TABLE_2" corresponds to summary object 306.

In S110, aggregate data retrieving device 222 may retrieve the current aggregate data using second query 206. FIG. 4 provides a detailed view of this process. As depicted in FIG. 4, in S201, aggregate data retrieving device 222 may determine what native format data source 300 supports. In S202, aggregate data retrieving device 222 may convert or transform second query 206 into that format. As noted above, this may involve, for example, converting second query 206 into a native EWS message. In S203, aggregate data retrieving device 222 may instruct I/O device 226 to send second query 206 in the supported format to data source 300. When data source 300 receives second query 206, data source 300 may return the current aggregate data to system 200. And, in S204, system 200 (more specifically, I/O device 226) may receive the current aggregate data. Specifically, system 200 may receive the single row of values in Table 2.

In S113, aggregate data mapping device 224 may map the current aggregate data to columns identified in first query 204. Such columns may correspond to the particular data (e.g., relevant data) that was requested by the client. In this example, the mapping from second query 206 to first query 204 may involve: (1) mapping the value retrieved by SELECT COUNT_BYTES in second query 206 to SELECT COUNT (BYTES) in first query 204, and (2) mapping the value retrieved by SELECT SUM_BYTES in second query 206 to SELECT SUM(BYTES) in first query 204. Then, in S115, aggregate data providing device 225 may provide the current aggregate data as mapped. Specifically, aggregate data providing device 225 may instruct I/O device 226 to send the current aggregate data as mapped to client machine 104. Interface 106 may then present (e.g., display, recite) the current aggregate data to the client.

When requested aggregate data determining device 219 determines to provide periodic aggregate data (S107: YES), the process proceeds to S111. As noted above, periodic aggregate data may correspond to aggregate data that is generated by data source 300 at set intervals. System 200 may be programmed to instruct data source 300 to generate periodic aggregate data for certain result sets. Such result sets may be ones that are frequently accessed by clients. Accordingly, to reduce turnaround time when a new query or request is received, system 200 may be programmed to repeatedly send instructions to generate periodic aggregate data based on one or more aggregation functions to data source 300. Data source 300, in response to receiving each instruction, may destroy the periodic aggregate data that was previously generated, and to regenerate new periodic aggregate data. In certain configurations, the periodic aggregate data may also be placed in summary object 306. For example, summary object 306 may be modified to have two rows of aggregate data, one for current aggregate data and another for periodic aggregate data. Table 3 may be an example of such an object:

TABLE 3

| AGGREGATE_TYPE | ... | COUNT_BYTES | SUM_BYTES |
|---|---|---|---|
| Current Aggregate Data | ... | 134,976 | 9,216,353,280 |
| Periodic Aggregate Data | ... | 134,976 | 9,216,357,376 |

Note that the periodic summary data may be different than the current summary data because each is generated at a different time. In particular, the periodic summary data may have been generated some time ago, when the last instruction to generate periodic summary data was received by data source 300.

In other configurations, the periodic aggregate data may be paced in a different summary object (not shown).

Then, when system 200 receives a new query requesting aggregate data, system 200 may retrieve the most recently generated periodic aggregate data from data source 300 without having to wait for data source 300 to generate current aggregate data. Certainly, when a client requires or requests real-time or current aggregate data (described above), system 200 may still provide current aggregate data. Moreover, when periodic aggregate data for a particular aggregation function does not exist (e.g., system 200 was not programmed to instruct data source 300 to generate such periodic aggregate data), system 200 may revert to providing current aggregate data. In such instances, system 200 may notify an administrator that a request for certain periodic aggregate data was received and allow the administrator to determine whether to instruct system 200 to generate such periodic aggregate data in the future.

In S111, query generating device 212 may generate a third query 207. Third query 207 may also be based on first query 204; however, third query 207 may request the periodic summary data. Referring to Table 3, third query 207 may be, for example:
SELECT COUNT_BYTES, SUM_BYTES FROM DATASOURCE_1.TABLE_3 WHERE AGGREGATE_TYPE='Periodic Aggregate Data'
where the data source identifier "DATASOURCE_1" corresponds to data source 300 and the object identifier "TABLE_3" corresponds to summary object 306.

Then, in S112, aggregate data retrieving device 222 may retrieve the periodic aggregate data using third query 207. This process may be the same as the process depicted in FIG. 4, except that third query 207 is converted and used instead of second query 206. The process may then proceed to S113, where aggregate data mapping device 224 maps the periodic aggregate data to the columns identified in first query 204, and S115, where aggregate data providing device 225 provides the periodic aggregate data as mapped to the client.

In certain configurations, first query 204 may be stored in a location other than memory 202 (e.g., a remote storage device). In different configurations, one or more of S103-S115 may be performed before, concurrently, or after one or more of S103-S115. In particular configurations, S105-S106 may be omitted. Thus, the process depicted in FIG. 3 may proceed directly from S103 to S107 when first query 204 comprises an aggregation function (S103: YES). In some configurations, system 200 may not be configured to provide periodic aggregate data. Accordingly, S107, S111, and S112 may be omitted, and the process may proceed directly from S106 to S108 when big data object determining device 218 determines that data object 304 comprises the predetermined amount of data (e.g., when big data object determining device 218 determines that data object 304 is a big data object).

The flowcharts and diagrams in FIGS. 1-4 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
  receiving a first database query, the first database query requesting particular data associated with a first object, the first object stored on a data source;
  determining whether the first database query comprises an aggregation;
  sending an instruction to generate current aggregate data based on the aggregation to the data source in response to determining that the first database query comprises the aggregation, wherein:
    the instruction to generate the current aggregate data is generated based on the aggregation,
    the current aggregate data corresponds to the particular data,
    the data source is configured to generate the current aggregate data in response to receiving the instruction to generate the current aggregate data;
  generating a second database query based on the first database query in response to sending the instruction to generate the current aggregate data, the second database query requesting the current aggregate data;
  retrieving the current aggregate data using the second database query in response to generating the second database query;
  providing the current aggregate data in response to retrieving the current aggregate data; and issuing the first query in response to determining that the first database query does not comprise the aggregation.

2. The method of claim 1, wherein the current aggregate data is located in a second object, the second object stored on the data source,
wherein the data source is further configured to generate the second object.

3. The method of claim 1, further comprising:
obtaining a description of the first object in response to determining that the first database query comprises the aggregation; and
determining whether the first object comprises a predetermined amount of data based on the description of the first object,
wherein sending the instruction to generate the current aggregate data comprises sending the instruction to generate the current aggregate data to the data source in response to determining that the first object comprises the predetermined amount of data,
wherein issuing the first query comprises issuing the first query in response to determining that the first object does not comprise the predetermined amount of data.

4. The method of claim 1, further comprising:
periodically sending an instruction to generate periodic aggregate data based on the aggregation to the data source, the periodic aggregate data corresponding to the particular data and the data source configured to, in response to receiving each instruction to generate the periodic aggregate data:
destroy the periodic aggregate data that was previously generated; and
regenerate the periodic aggregate data; and
determining whether to provide the periodic aggregate data in response to determining that the first database query comprises the aggregation;
generating a third database query based on the first database query in response to determining to provide the periodic aggregate data, the third database query requesting the periodic aggregate data;
retrieving the periodic aggregate data using the third database query in response to generating the third database query; and
providing the periodic aggregate data in response to retrieving the periodic aggregate data,
wherein sending the instruction to generate current aggregate data comprises sending the instruction to generate current aggregate data in response to determining to not provide the periodic aggregate data.

5. The method of claim 1, further comprising:
mapping the current aggregate data to a column identified in the first database query in response to retrieving the current aggregate data, the column corresponding to the particular data,
wherein providing the current aggregate data comprises providing the current aggregate data based on the mapping.

6. The method of claim 1, wherein retrieving the current aggregate data using the second database query comprises:
converting the second database query into a format supported by the data source;
sending the second database query in the format to the data source; and
receiving the current aggregate data from the data source.

7. The method of claim 1, wherein the aggregation corresponds to an aggregation function, the aggregation function comprising one of: a count function, a maximum function, a minimum function, a first value function, a last value function, and a sum function.

8. A system comprising:
a first receiving device configured to receive a first database query, the first database query requesting particular data associated with a first object, the first object stored on a data source;
a first determining device configured to determine whether the first database query comprises an aggregation;
a first sending device configured to send an instruction to generate current aggregate data based on the aggregation to the data source in response to determining that the first database query comprises the aggregation, wherein:
the instruction to generate the current aggregate data is generated based on the aggregation,
the current aggregate data corresponds to the particular data,
the data source is configured to generate the current aggregate data in response to receiving the instruction to generate the current aggregate data;
a first generating device configured to generate a second database query based on the first database query in response to sending the instruction to generate the current aggregate data, the second database query requesting the current aggregate data;
a first retrieving device configured to retrieve the current aggregate data using the second database query in response to generating the second database query;
a first providing device configured to provide the current aggregate data in response to retrieving the current aggregate data; and
a standard issuing device configured to issue the first query in response to determining that the first database query does not comprise the aggregation.

9. The system according to claim 8, wherein the current aggregate data is located in a second object, the second object stored on the data source,
wherein the data source is further configured to generate the second object.

10. The system of claim 8, further comprising:
an obtaining device configured to obtain a description of the first object in response to determining that the first database query comprises the aggregation; and
a second determining device configured to determine whether the first object comprises a predetermined amount of data based on the description of the first object,
wherein the first sending device is configured to send the instruction to generate the current aggregate data to the data source in response to determining that the first object comprises the predetermined amount of data,
wherein the standard issuing device is configured to issue the first query in response to determining that the first object does not comprise the predetermined amount of data.

11. The system of claim 8, further comprising:
a second sending device configured to periodically send an instruction to generate periodic aggregate data based on the aggregation to the data source, the periodic aggregate data corresponding to the particular data and the data source configured to, in response to receiving each instruction to generate the periodic aggregate data:
destroy the periodic aggregate data that was previously generated; and
regenerate the periodic aggregate data; and a third determining device configured to determine whether to provide the periodic aggregate data in response to determining that the first database query comprises the aggregation;
a second generating device configured to generate a third database query based on the first database query in response to determining to provide the periodic aggregate data, the third database query requesting the periodic aggregate data;
a second retrieving device configured to retrieve the periodic aggregate data using the third database query in response to generating the third database query; and
a second providing device configured to provide the periodic aggregate data in response to retrieving the periodic aggregate data,
wherein the first sending device is configured to send the instruction to generate current aggregate data to the data source in response to determining to not provide the periodic aggregate data.

12. The system of claim 8, further comprising:
a mapping device configured to map the current aggregate data to a column identified in the first database query in response to retrieving the current aggregate data, the column corresponding to the particular data,
wherein the first providing device is configured to provide the current aggregate data based on the mapping.

13. The system of claim 8, wherein the first retrieving device comprises:
a converting device configured to convert the second database query into a format supported by the data source;
a third sending device configured to send the second database query in the format to the data source; and
a second receiving device configured to receive the current aggregate data from the data source.

14. The system of claim 8, wherein the aggregation corresponds to an aggregation function, the aggregation function comprising one of: a count function, a maximum function, a minimum function, a first value function, a last value function, and a sum function.

15. A computer program product comprising:
a computer readable storage medium having computer readable program code embodied therewith, the computer readable program code comprising:
computer readable program code configured to receive a first database query, the first database query requesting particular data associated with a first object, the first object stored on a data source;
computer readable program code configured to determine whether the first database query comprises an aggregation;
computer readable program code configured to send an instruction to generate current aggregate data based on the aggregation to the data source in response to determining that the first database query comprises the aggregation, wherein:
the instruction to generate the current aggregate data is generated based on the aggregation,
the current aggregate data corresponds to the particular data,
the data source is configured to generate the current aggregate data in response to receiving the instruction;
computer readable program code configured to generate a second database query based on the first database query in response to sending the instruction to generate the current aggregate data, the second database query requesting the current aggregate data;
computer readable program code configured to retrieve the current aggregate data using the second database query in response to generating the second database query;
computer readable program code configured to provide the current aggregate data in response to retrieving the current aggregate data; and
computer readable program code configured to issue the first query in response to determining that the first database query does not comprise the aggregation.

16. The computer program product according to claim 15, wherein the current aggregate data is located in a second object, the second object stored on the data source,
wherein the data source is further configured to generate the second object.

17. The computer program product according to claim 15, further comprising:
computer readable program code configured to obtain a description of the first object in response to determining that the first database query comprises the aggregation; and
computer readable program code configured to determine whether the first object comprises a predetermined amount of data based on the description of the first object,
wherein the computer readable program code configured to send the instruction to generate the current aggregate data comprises computer readable program code configured to send the instruction to generate the current aggregate data to the data source in response to determining that the first object comprises the predetermined amount of data,
wherein the computer readable program code configured to issue the first query comprises computer readable program code configured to issue the first query in response to determining that the first object does not comprise the predetermined amount of data.

18. The computer program product according to claim 15, further comprising:
computer readable program code configured to periodically send an instruction to generate periodic aggregate data based on the aggregation to the data source, the periodic aggregate data corresponding to the particular data and the data source configured to, in response to receiving each instruction to generate the periodic aggregate data:
destroy the periodic aggregate data that was previously generated; and
regenerate the periodic aggregate data; and
computer readable program code configured to determine whether to provide the periodic aggregate data in response to determining that the first database query comprises the aggregation;
computer readable program code configured to generate a third database query based on the first database query in response to determining to provide the periodic aggregate data, the third database query requesting the periodic aggregate data;
computer readable program code configured to retrieve the periodic aggregate data using the third database query in response to generating the third database query; and
computer readable program code configured to provide the periodic aggregate data in response to retrieving the periodic aggregate data,
wherein the computer readable program code configured to send the instruction to generate the current aggregate data comprises computer readable program code configured to send the instruction to generate the current aggregate data to the data source in response to determining to not provide the periodic aggregate data.

19. The computer program product according to claim 15, further comprising:

computer readable program code configured to map the current aggregate data to a column identified in the first database query in response to retrieving the current aggregate data, the column corresponding to the particular data, wherein the computer readable program code configured to provide the current aggregate data comprises computer readable program code configured to provide the current aggregate data based on the mapping.

20. The computer program product according to claim 15, wherein the computer readable program code configured to retrieve the current aggregate data using the second database query comprises:

computer readable program code configured to convert the second database query into a format supported by the data source;

computer readable program code configured to send the second database query in the format to the data source; and computer readable program code configured to receive the current aggregate data from the data source.

21. The computer program product according to claim 15, wherein the aggregation corresponds to an aggregation function, the aggregation function comprising one of: a count function, a maximum function, a minimum function, a first value function, a last value function, and a sum function.

* * * * *